United States Patent
Prado et al.

(10) Patent No.: US 12,495,055 B2
(45) Date of Patent: Dec. 9, 2025

(54) NON-ANONYMIZED PRIVACY PRESERVING GLOBAL AND LOCAL ANOMALY DETECTION IN DISTRIBUTED SYSTEMS

(71) Applicant: Dell Products L.P., Round Rock, TX (US)

(72) Inventors: Adriana Bechara Prado, Niterói (BR); Alexander Eulalio Robles Robles, Valinhos (BR); Eduarda Tatiane Chagas, Belo Horizonte (BR); Karen Stéfany Martins, Belo Horizonte (BR); Isabella Costa Maia, São Paulo (BR)

(73) Assignee: Dell Products L.P., Round Rock, TX (US)

( * ) Notice: Subject to any disclaimer, the term of this patent is extended or adjusted under 35 U.S.C. 154(b) by 375 days.

(21) Appl. No.: 18/175,343

(22) Filed: Feb. 27, 2023

(65) Prior Publication Data
US 2024/0291838 A1    Aug. 29, 2024

(51) Int. Cl.
*H04L 9/40*    (2022.01)
*H04L 9/08*    (2006.01)
(Continued)

(52) U.S. Cl.
CPC ........ *H04L 63/1425* (2013.01); *H04L 9/0838* (2013.01); *H04L 9/085* (2013.01);
(Continued)

(58) Field of Classification Search
CPC ... H04L 63/1425; H04L 9/0838; H04L 9/085; H04L 9/0861; H04L 9/14; H04L 9/3073; H04L 9/0891
See application file for complete search history.

(56) References Cited

U.S. PATENT DOCUMENTS 5,150,381 A * 9/1992 Forney, Jr. .......... H04L 27/3422
                                                714/795
5,214,672 A * 5/1993 Eyuboglu ............. H03M 13/25
                                                714/792
(Continued)

FOREIGN PATENT DOCUMENTS

CN        117221882 A  * 12/2023
CN        119788426 B  *  5/2025

OTHER PUBLICATIONS

Joint Task Force (2018) Risk Management Framework for Information Systems and Organizations: A System Life Cycle Approach for Security and Privacy. (National Institute of Standards and Technology, Gaithersburg, MD), NIST Special Publication (SP) 800-37, Rev. 2., https://doi.org/10.6028/NIST_SP.800-37r2.

(Continued)

*Primary Examiner* — John B King
(74) *Attorney, Agent, or Firm* — Workman Nydegger

(57) ABSTRACT

One example method may be performed in a distributed environment that includes a group of nodes configured to communicate with each other, and to communicate with a central node of the distributed environment. The example method includes performing, by two or more of the nodes, the operations of generating a public/private key pair, generating a secret shared key using the respective public keys of the other nodes, using the secret shared key to generate isometric transformations of data of the node, and transmitting the transformed data to the central node.

18 Claims, 5 Drawing Sheets

(51) Int. Cl.
  *H04L 9/14* (2006.01)
  *H04L 9/30* (2006.01)
(52) U.S. Cl.
  CPC .............. *H04L 9/0861* (2013.01); *H04L 9/14* (2013.01); *H04L 9/3073* (2013.01)

(56) References Cited

U.S. PATENT DOCUMENTS

| | | | | |
|---|---|---|---|---|
| 8,397,062 | B2* | 3/2013 | Roy-Chowdhury | H04L 9/14 713/157 |
| 11,770,242 | B1* | 9/2023 | Jung | H04L 9/0825 713/171 |
| 2005/0166041 | A1* | 7/2005 | Brown | H04L 63/0823 713/150 |
| 2006/0053490 | A1* | 3/2006 | Herz | H04L 63/1425 726/23 |
| 2009/0296924 | A1* | 12/2009 | Oksman | H04L 9/321 380/255 |
| 2014/0215612 | A1* | 7/2014 | Niccolini | H04L 63/1425 726/22 |
| 2015/0193695 | A1* | 7/2015 | Cruz Mota | H04L 63/1425 706/12 |
| 2017/0093899 | A1* | 3/2017 | Horesh | G06N 5/04 |
| 2017/0109463 | A1* | 4/2017 | Iza-Teran | G06F 17/16 |
| 2018/0007039 | A1* | 1/2018 | Lloyd | G06Q 20/4097 |
| 2021/0058792 | A1* | 2/2021 | Bhushan | H04L 27/345 |
| 2021/0142508 | A1* | 5/2021 | Azimi | G02B 27/017 |
| 2022/0006835 | A1* | 1/2022 | Gray | H04L 9/0838 |
| 2025/0070971 | A1* | 2/2025 | Wang | G06F 21/6245 |

OTHER PUBLICATIONS

C.C.M. Yeh et al., "Matrix Profile I: All Pairs Similarity Joins for Time Series: A Unifying View that Includes Motifs, Discords and Shapelets," Proc' of 16th IEEE ICDM, 2016, pp. 1317-1322.

Takaaki Nakamura, Makoto Imamura, Ryan Mercer, and Eamonn Keogh. 2020. MERLIN: Parameter-Free Discovery of Arbitrary Length Anomalies in Massive Time Series Archives. In 2020 IEEE International Conference on Data Mining (ICDM). IEEE, 1190-1195.

"Finding Approximately Repeated Patterns in Time Series". Available at https://www.youtube.com/watch?v=BYjOp2NoDdc.

* cited by examiner

NON-ANONYMIZED PRIVACY PRESERVING GLOBAL AND LOCAL ANOMALY DETECTION IN DISTRIBUTED SYSTEMS

FIELD OF THE INVENTION

Embodiments of the present invention generally relate to anomaly detection in distributed systems that handle data. More particularly, at least some embodiments of the invention relate to systems, hardware, software, computer-readable media, and methods, for detecting anomalies, both at local and global levels, in the data of peers in a distributed system while preserving the privacy of the peer data.

BACKGROUND

Zero Trust (ZT) is a security framework with the motto "never trust, always verify." One of the ZT core strategies is to collect telemetry data to feed Machine Learning (ML) models to identify abnormal behaviors. In this framework, all participants of a network must be constantly monitored to verify if there are irregularities happening at user or system level.

User and Entity Behavior Analytics (UEBA) is a tool whose goals are to detect abnormal user activities, such as insider attacks and private data exfiltration for example, and to generate corresponding alerts for security teams whenever necessary. One of the core components of UEEBA is Anomaly Detection (AD) models, whose input data may include, for example, activity logs, and sequences of open files.

While there are many definitions in the literature for what constitutes an 'anomaly,' one definition has become particularly widely used due to the ease with which it can be understood and parameterized. This anomaly is sometimes referred to as a 'time series discord.' Time series discords are sub-sequences of a time series that are maximally far away from their nearest neighbors.

As stated in the following NIST publication, an important part of migrating to a Zero Trust Architecture (ZTA) is implementing the Risk Management Framework (RMF): *Joint Task Force* (2018) *Risk Management Framework for Information Systems and organizations: A System Life Cycle Approach for Security and Privacy*. (*National Institute of Standards and Technology, Gaithersburg, MD*), *NIST Special Publication (SP)* 800-37, Rev. 2., //doi.org/10.6028/NIST.SP.800-37r2.

The steps and tasks described in that publication include not only continuous monitoring of information systems and organizations, but also the incorporation of security and privacy into the system development life cycle. This is not a trivial task since detecting abnormal activities may imply sending personal data, for example, to a central node to be analyzed, which, in turn, may violate privacy principles by receiving and/or analyzing that personal data.

Furthermore, in sophisticated cyberthreat scenarios, it is apparent that a bad actor can attack a network in such a way that log activities from local machines, or client nodes, show no abnormality, even though the global activity in the network would indicate an anomaly. Thus, anomalies with global implications, and/or local implications, may be missed by conventional approaches.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
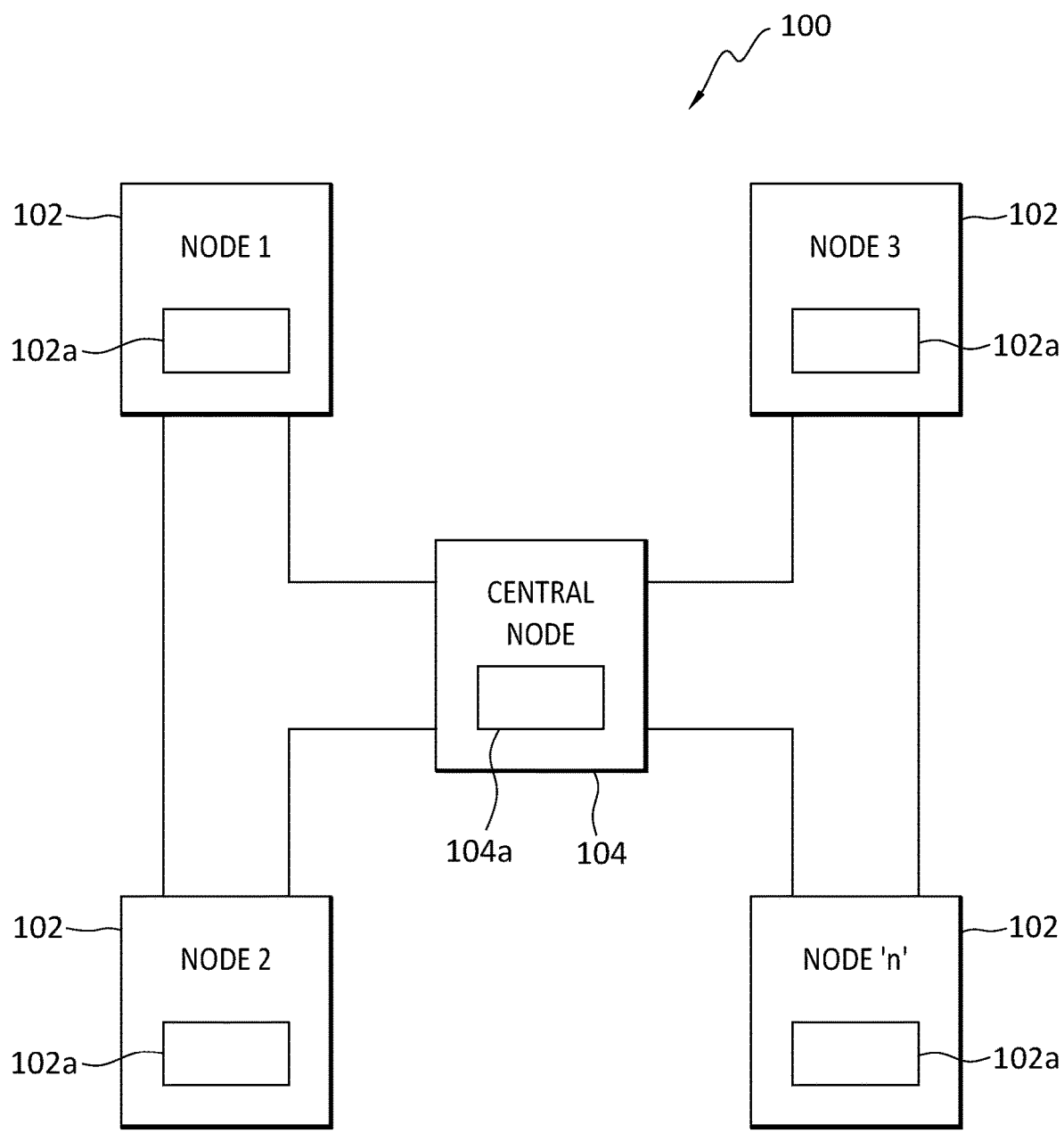
FIG. 1 is directed to a simplified rendering of an architecture according to one embodiment.

Embodiments of the present invention generally relate to anomaly detection in distributed systems that handle data. More particularly, at least some embodiments of the invention relate to systems, hardware, software, computer-readable media, and methods, for detecting anomalies, both at local and global levels, in the data of peers in a distributed system while preserving the privacy of the peer data.

In general, an embodiment of the invention comprises a method that employs the identification of time series discords, in order to detect not only local anomalies, but also global anomalies, while preserving privacy of the parties involved in a distributed system scenario. In more detail, an embodiment may comprise setup phase that comprises obtaining a secret value that is common to all client nodes of a distributed system. This setup may serve to generate, for each node, a respective matrix to modify the local data, but without transmitting the original data samples over the network, or to the central node. The node matrices may then be multiplied together to obtain a complete transformation matrix T which may be common to all the client nodes, but unknown to the central node. Each client may then use the transformation matrix T to transform its respective time series data, and send the transformed data to the central node. The central node may then apply a time series discord algorithm to identify, on an individual node basis, and/or on a system wide basis, any anomalies in the data and/or the clients, or nodes, from which the transformed data was received. Because the central node receives only the transformations, and not the actual data upon which the transformations are based, the privacy and security of the respective data of the nodes may be preserved.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that both local and global data anomalies may be identified in a distributed system, while preserving the privacy of the data. As another example, the anomalies may be identified without revealing the data to the entity performing the identification, or to other members of the distributed system. An embodiment may operate to identify a compromised node, such as a client, of the distributed system, while still preserving the privacy of the data of the nodes in the distributed system. Various other advantages of some example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. EXAMPLE ARCHITECTURE

An embodiment of the invention may be implemented in connection with a distributed environment where there is a need to unite data generated by nodes of the distributed environment. This environmental structure may enable multiple time series, each associated with a respective node, to be jointly analyzed by a central node of the distributed environment. More specifically, such an environment may accordingly benefit from the implementation and use of a ZTA that is able to detect anomalies both at local and global levels while preserving the data privacy of each peer, or node, in the distributed environment.

Such a distributed environment, according to one embodiment, may comprise, for example, a computer network where each computer is able to communicate with another one from the same network, including a central server with which the computers are also able to communicate. The central server, which may form a central node of the network, may be able to compute both local anomalies respecting the data of a single node, and global anomalies across data of all the nodes, without compromising the privacy of any node or its data. The central server may also generate alerts whenever it identifies a possible threat within the system. In an embodiment, the central server may be able to identify the compromised user(s) in order to address the identified issues.

With reference now to FIG. 1, a simplified architecture 100 is disclosed within which an embodiment of the invention may be implemented. As shown there, the architecture 100 may comprise any number 'n' of nodes 102 that may communicate with each other, and with a central node 104. In general, and as disclosed elsewhere herein, each of the nodes 102 may comprise a respective instance of a module 102a configured and operable to perform any of the methods, processes, and operations, disclosed herein as being performed in whole or in part by/at a node. Likewise, the central node 104 may comprise a module 104a configured and operable to perform any of the methods, processes, and operations, disclosed herein as being performed in whole or in part by/at a central node.

Note that in an embodiment, the nodes 102 need not be able to communicate with each other, and may instead each communicate only with the central node 104 to obtain the public keys of the other nodes 102. In particular, in one embodiment, each node 102 may communicate its own public key to the central node 104 and would get to know the public keys from all other nodes 102 by way of the central node 104. As the central node 104 may not know the secret key from any of the nodes 102, the central node 104 may not be able to infer the shared secret key. Further details concerning these keys are provided elsewhere herein.

B. OVERVIEW

As noted earlier, an embodiment of the invention may comprise a method that employs the identification of time series discords, in order to detect not only local anomalies, but also global anomalies, while preserving privacy of the parties involved in a distributed system scenario. An embodiment may be implemented in an environment such as a distributed network of nodes, which may each comprise a compute, where each node generates activity logs that comprise respective multidimensional time series.

One embodiment may commence with a setup phase whose objective is to introduce privacy by obtaining a secret value that is common to all client nodes. This setup may serve to generate a matrix to modify the local data, without transmitting the original samples, that is, the data over the network or to the central node. As discussed later herein, this transformation may have no effect in what concerns the process of finding time series discords. Below, there is provided a description of one possible sequence of algorithms that may be used to generate a matrix and corresponding keys.

In an embodiment, the first operation in a setup phase comprises each of the network elements, such as the client nodes and the central node, receiving a parameter k that will produce another public parameter pp over which a methodology as disclosed herein, may be parameterized. Then, each client node may use a generating function over pp to generate a pair of keys that includes a private key and a public key for that node. Each client node may then then combine its private key with the respective public keys from all other client nodes. This combination may be implemented using a key agreement function. This key agreement function, which may comprise a Diffie-Hellman agreement for example, may produce symmetric values. That is, the combination of the private key from any client node i with all public keys from all other client nodes results in the same combination, for each node, of [1] the private key of j specific to the node with [2] all public keys from all other client nodes. In this way, an embodiment may generate a shared secret value between client nodes, that is, a value that is common to all client nodes in the network, but unknown to the central node.

This approach may be used, in an embodiment, to generate as many shared secret values as needed to use as seed of a random generator which may be used to create three transformation matrices, with each transformation matrix representing a respective isometric linear transformation, namely, rotation, reflection, and translation. In an embodiment, these three matrices may be multiplied together to finally obtain a complete transformation matrix T that is common to all client nodes, but unknown to the central node.

After accumulating t time steps, each node may then send a signed time window to the central node, which can verify the validity of the message using the public key of the sender. But, instead of sending the original time series, the node may first transform each point of the original time series, which may take the form of a multidimensional vector, using the transformation matrix T. The central node will then have a collection of isometrically transformed data points from the whole network, indexed both by time and by client node. Since the data may lie in a different feature space, of the same dimension, the original content, that is, the data, is already invisible to the central node, which allows the data to be non-anonymized while also hindering attempts to compromise the privacy of the data.

Furthermore, isometric transformations such as may be employed in an embodiment have a fundamental property, which may be useful in algorithms for finding time series discords, namely, the distance between data points is preserved, even though the data points have been transformed. Consequently, even if data is transformed, such algorithms will behave likewise as they search for sub-sequences that are maximally distant from each other, and this measure is preserved.

The central node, applying a discord finding algorithm, as discussed elsewhere herein, may then treat data from the whole network all at once to detect global anomalies, and identify compromised client nodes. Additionally, or alternatively, the central node may filter data on an individual node basis, and apply the discord finding algorithm to identify local anomalies, that is, anomalies specific to a particular node, or subset of nodes. Once an anomaly is identified by the central node, a security alert may be raised and the whole system, except for the client node(s) exhibiting the anomalous behavior, returned to the setup phase.

Note that a method according to one embodiment may not imply overheads from other privacy-inducing approaches such as cryptographic solutions, which may be prohibitive in terms of computational cost. Nor does such a method imply or require a traditional multi-party computation approach, which typically perform some form of aggregation in data that could cause loss of performance in an AD (anomaly detection) model.

C. CONTEXT FOR AN EMBODIMENT

Following is a discussion of time series discord finding, which may be applied in an embodiment of the invention. Note that though the definitions below are made for the illustrative case of a 1-dimensional, or univariate, time series, the concepts and techniques re easily extended to the n-dimensional case, as described herein. Thus, the discussion below is presented by way of example, and is not intended to limit the scope of the invention in any way.

Definition 1: A univariate (single variable) time series $X=(X_1, X_2, \ldots, X_P)$ is a sequence of P real values (sequence of measurements of the values of the same variable over time)

Definition 2: A sub-sequence $X_{i,L}$ is a contiguous subset of values of length L starting from position i in time series X. L is a user-defined sub-sequence length with values between $3 \leq L \leq |X|$. Algorithms for finding time series discords may compare sub-sequences using some distance measure Dist. One approach that may be used, in an embodiment, for a distance measurement is the z-normalized Euclidean distance. Regardless of the distance measurement employed, it may be important to exclude trivial matches in order to establish a meaningful definition of sub-sequence similarity by defining non-self matches.

Definition 3: Non-self match: Given two sub-sequences C and M of a time series X starting at p and q, respectively, it can be said that C and M are a non-self match at Dist(M, C)|p−q|≥L, that is, if the sub-sequences C and M do not overlap in time with each other.

Definition 4: Time Series Discord: Given a time series X, the sub-sequence D of length L beginning at position i is said to be a discord of X if D has the largest distance to its nearest non-self match. The starting location of the discord is recorded in the variable index and its distance to its nearest neighbor is recorded in the variable distance.

There are multiple approaches that address this problem, such as Matrix Profile and MERLIN. While Matrix Profile relies on the setting of a hyperparameter, namely, a window size L, by the user, MERLIN reaches SOTA on finding time series discords by searching all of its lengths in a given range. It thus produces an array of discords indexed by the length of window $L_i$, $discord_{Li}=[index_{Li}, distance_{Li}]$, allowing verification of a wider scenario of anomaly while doing so with a feasible computational complexity. See, e.g., C. C. M. Yeh et al., "*Matrix Profile I: All Pairs Similarity Joins for Time Series: A Unifying View that Includes Motifs, Discords and Shapelets,*" *Proc'* of 16*th IEEE ICDM*, 2016, pp. 1317-22 (incorporated herein in its entirety by this reference).

Figure 2:
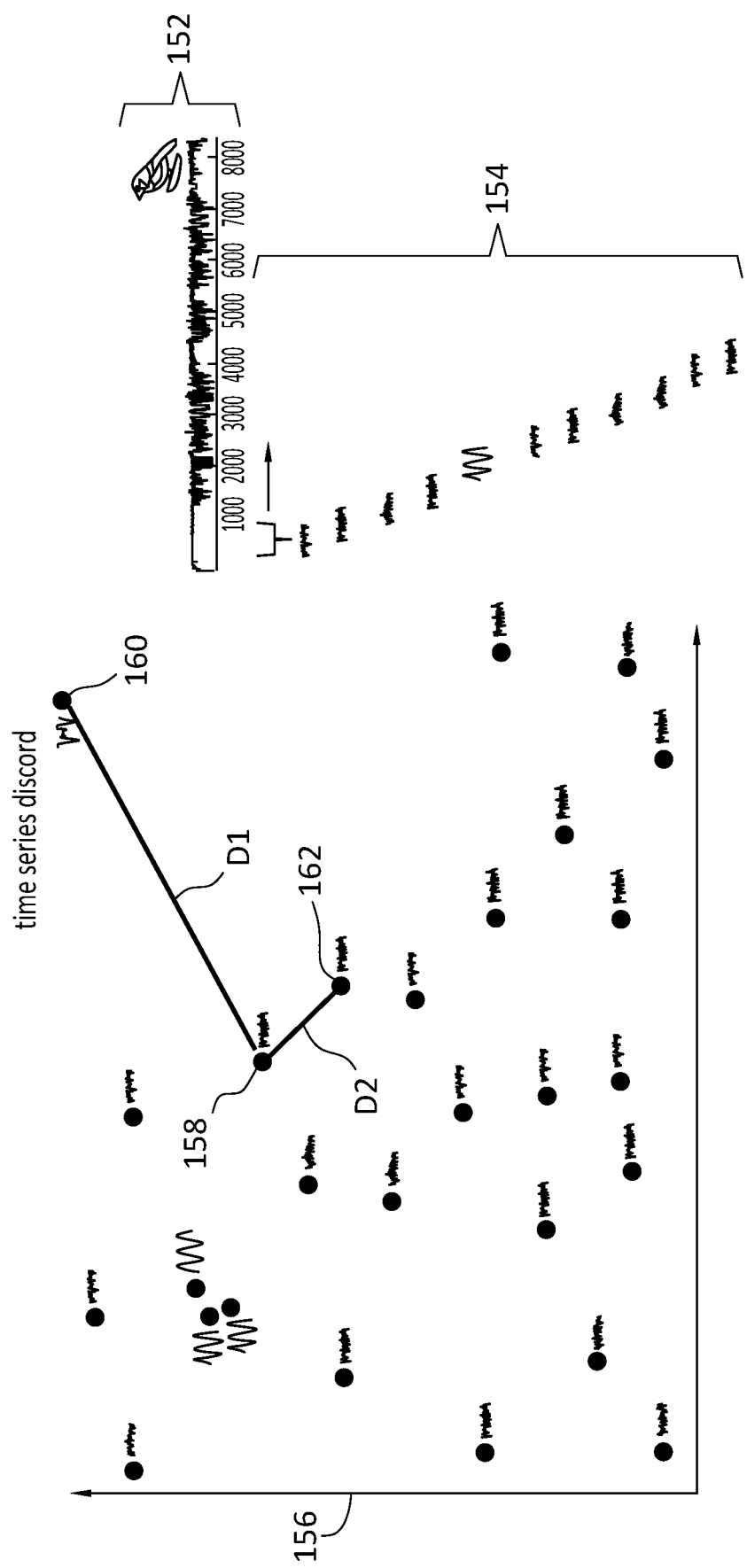
FIG. 2 discloses aspects of a visual mapping of a time series, according to one embodiment.

With reference now to FIG. 2 (see "*Finding Approximately Repeated Patterns in Time Series*". Available at <https://www.youtube.com/watch?v=BYjOp2NoDdc) (incorporated herein in its entirety by this reference), there is disclosed an approach for visual mapping of a time series 152 sliced in several sub-sequences 154 using a sliding window of constant length. Using a distance metric such as Dist for example, an embodiment may calculate the Dist value between two sub-sequences M, C using the function Dist(M,C). Note that where two sliding windows overlap, it may not be possible to measure a distance between the sub-sequences. This approach provides a measure of similarity, expressed as proximity between sub-sequences in a feature space 156. By way of illustration, a distance D1 between a sub-sequence 158 and a sub-sequence 160 can be seen to be significantly larger than a distance D2, for example, between the sub-sequence 158 and various other sub-sequences such as sub-sequence 162. Thus, the illustrative example of FIG. 2 suggests that the sub-sequence 160 corresponds to an anomaly of some type, whether it be a local anomaly, global anomaly, or an anomaly specific to a particular node, for example. Note that as also suggested in FIG. 2, it may be useful to consider time series sub-sequences as respective points in an m-dimensional space.

Figure 3:
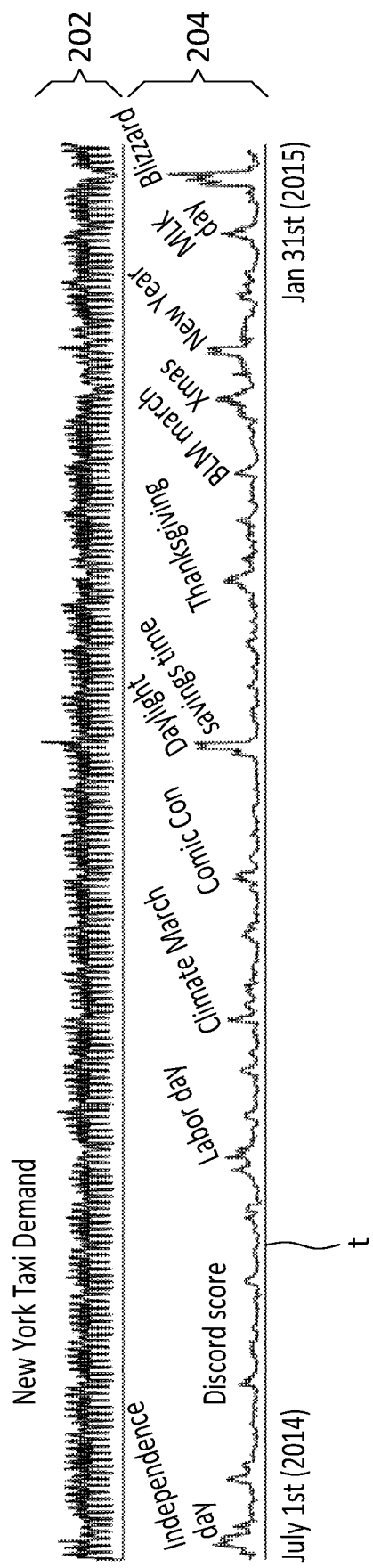
FIG. 3 discloses aspects of a time series and its matrix profile, indicating an extent to which particular time series data is dissimilar with respect to the rest of the data in the time series.

With reference now to FIG. 3 (see *Takaaki Nakamura, Makoto Imamura, Ryan Mercer, and Eamonn Keogh.* 2020. *MERLIN: Parameter-Free Discovery of Arbitrary Length*

*Anomalies in Massive Time Series Archives. In* 2020 *IEEE International Conference on Data Mining (ICDM). IEEE,* 1190-1195) (incorporated herein in its entirety by this reference), there is disclosed a time series 202, and a matrix profile 204 of the time series 202. The matrix profile 204 may also be referred to as a discord score. For example, the peaks in the matrix profile 204 correspond to a relatively high level of dissimilarity with respect to the rest of the time series. A peak may be a local maximum, as well as a global maximum. Thus, the matrix profile 204 embodies a function that may enable ready visual identification of time series discords. That is, at a given position t, the value of the matrix profile 204 corresponds to the distance of the sub-sequence at the same instant t on the original time series to its nearest non-self-match. That means that a matrix profile 204 value may be seen as a discord score for each one of the sub-sequences.

D. DETAILED DESCRIPTION OF AN EXAMPLE EMBODIMENT

As noted elsewhere herein, an embodiment of the invention may comprise a setup phase, in which secret and public keys are obtained and used to generate obtain signatures that will prove authenticity of transmitted messages to the server and to build a secret shared transformation matrix across client nodes. In particular, let U be the ensemble of client nodes within a network. For a given time interval P, each client node A in U generates a possibly multidimensional time series $X^A = (X_t^A : t \in P)$ with $X_t^A \in \mathbb{R}^n$ being the n-dimensional data evaluated at a particular instant t.

D.1 Setup

In an embodiment, a key agreement may comprise a tuple of algorithms, namely, KA.param, KA.gen, and KA.agree. A setup phase according to one embodiment may comprise the following operations, in which every node, or client, and the server, starts with a common value k. At each one of the values k, the algorithm KA.param(k)→pp produces some public parameters, over which a scheme according to one embodiment may be parameterized.

[1] KA.gen(pp)→(SA, PA) enables any client node A, ∀A∈U, to generate a key pair, where SA and PA are the secret and private keys from client node A, respectively.

[2] Then, each client node may use the agreement algorithm to generate a secret shared key by KA.agree(SA, $\overline{PA}$)→SU, where $\overline{PA}$ is a combination of all public keys from all client nodes, except A, for example $\Pi_{B \in U \setminus \{A\}} P_B$ and $S_U$ is a secret key shared across all client nodes in U.

[3] Each client node in U may perform [2] three times to obtain a shared secret value set $\{S_{U_{1:3}}\}$ to generate isometric transformations by using a pseudo-random number generator function PRNGS(·) thus:
 a. PRNG($S_{U_1}$)→reflection_value;
 b. PRNG($S_{U_2}$)→rotation_value; and
 c. PRNG($S_{U_3}$)→translation_value.

[4] Each client node in U may represent each of the above transformations (reflection_value, rotation_value, translation_value) as a respective n×n matrix, for a total of three matrices, and the node may then multiply the three matrices together to obtain a single transformation matrix that represents a linear transformation T: $\mathbb{R}n \rightarrow \mathbb{R}n$.

D.2 Data Transmission and Anomaly Detection

In an embodiment, each client node A in U may apply the transformation matrix T to a datapoint at instant t by applying $T(X_t^A) = X_t^{\sim A}$. In order to spare communication resources, A may accumulate P time steps of transformed data points obtaining $X^{\sim A} = (X^{\sim A} : t \in P)$. This, along with the private key of client A, may serve to generate a signature that may be sent, along with the sequence $X^{\sim A}$, by client A to the central node.

The central node may then receive the indexed transformed data from A and may use its public key to guarantee the legitimacy of the indexed transformed data. The central node May proceed likewise with all the other client nodes in U.

In an embodiment, the central node may use an algorithm for finding time series discords, as disclosed elsewhere herein, over the whole data ensemble, subsets of client nodes, and over data coming from single client nodes, in order to detect both global and local anomalies. Since each data point may be indexed with information indicating which client node sent that data point to the central node, once an anomaly is identified by the central node, a security alert may be raised containing the list of affected parties, or nodes. At this point, in one embodiment, the whole system may then return to the setup phase, restarting the process, but without the compromised client node(s).

Figure 4:
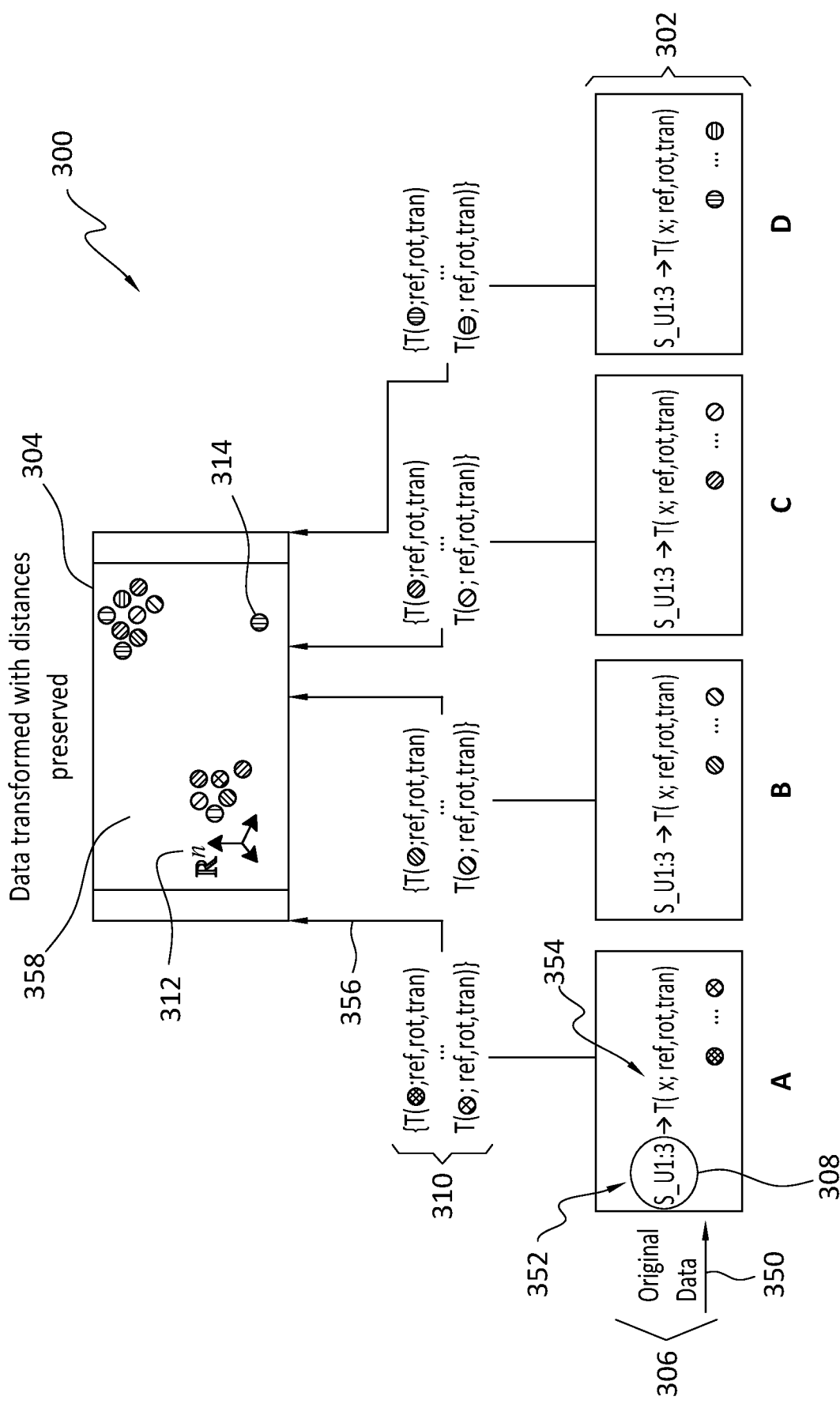
FIG. 4 discloses aspects of a method according to an example embodiment.

With reference now to the example of FIG. 4, there is disclosed a general method 300, according to one embodiment, for data transformation by a group of nodes 302, and data transmission from the nodes 302 to a central node 304. As shown, each of the nodes 302, and referring to node (A) 302 by way of illustration, may, at 350, receive, obtain, or have, data 306. The data 306 may or may not be unique to each of the nodes 302. In an embodiment, one or more of the nodes 302 may comprise an application, or other data generator, that may be used to create some or all of the data 306. In any case, each node 302 may obtain 352 a shared secret value 308. Next, each node 302 may apply 354 a transformation matrix T to the data 306 to generate transformed data 310 which may then be transmitted 356 to the central node 304. The central node may then apply 358 a time series discord finding algorithm 312 to identify an anomaly 314 without violating the privacy of any of the nodes 302, or data 306. Note that data points at the central node will have their positions in Rn changed, but the distance between two of the data points will remain the same as in the original data

E. EXAMPLE METHODS

It is noted with respect to the disclosed methods, including the example method of FIG. 4, that in an embodiment, operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. FURTHER EXAMPLE EMBODIMENTS

Following are some further example embodiments of the invention. These are presented only by way of example and are not intended to limit the scope of the invention in any way.

Embodiment 1. A method, comprising: in a distributed environment that includes a group of nodes configured to communicate with each other, and to communicate with a central node of the distributed environment, performing, by two or more of the nodes, operations comprising: generating a public/private key pair; generating a secret shared key using the respective public keys of the other nodes; using the secret shared key to generate isometric transformations of data of the node; and transmitting the transformed data to the central node.

Embodiment 2. The method as recited in any preceding embodiment, wherein the transformed data is non-anonymized but a privacy of the transformed data is preserved so that the data from which the transformed data was generated is not accessible by the central node.

Embodiment 3. The method as recited in any preceding embodiment, wherein the transformed data is usable by the central node to identify an anomaly when the central node applies a time series discord finding algorithm to the transformed data.

Embodiment 4. The method as recited in embodiment 3, wherein the anomaly is a local anomaly, or a global anomaly.

Embodiment 5. The method as recited in any preceding embodiment, wherein the data comprises a multivariate or univariate time series.

Embodiment 6. The method as recited in any preceding embodiment, wherein the secret shared key is generated using a key agreement comprising a tuple of algorithms.

Embodiment 7. The method as recited in embodiment 5, wherein the tuple of algorithms comprises: KA.param, KA.gen, and KA.agree.

Embodiment 8. The method as recited in any preceding embodiment, wherein the isometric transformations comprise a reflection value, a rotation value, and a translation value.

Embodiment 9. The method as recited in any preceding embodiment, wherein the transformed data is indexed with information identifying the node that sent the transformed data.

Embodiment 10. The method as recited in any preceding embodiment, wherein the secret shared key is not known to the central node.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
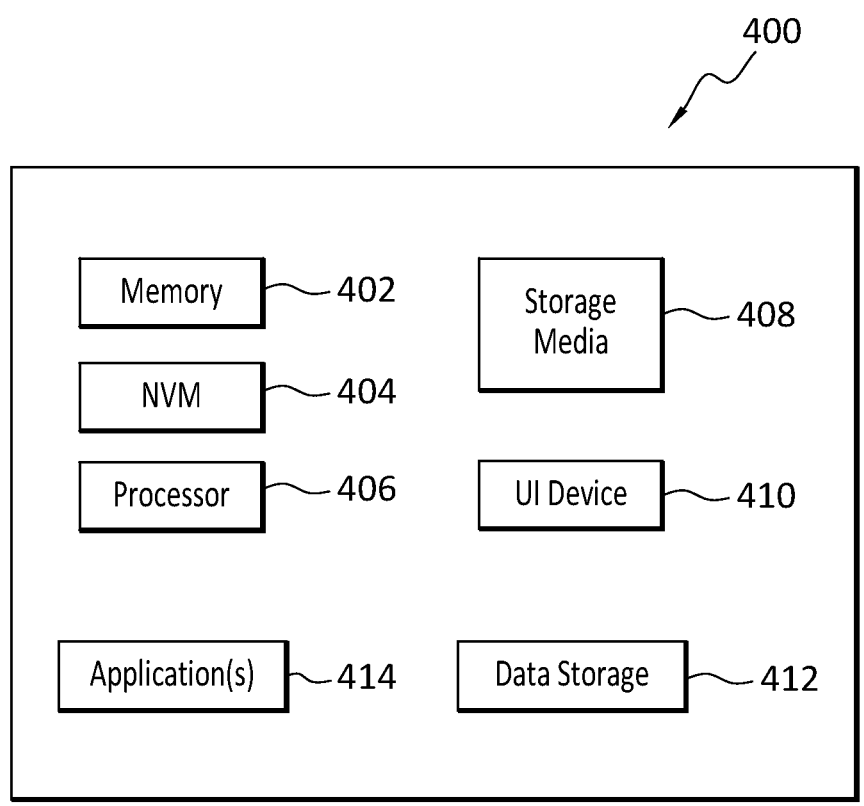
FIG. 5 discloses an example computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 5.

In the example of FIG. 5, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
in a distributed environment that includes a group of nodes configured to communicate with each other, and to communicate with a central node of the distributed environment, performing, by two or more of the nodes, operations comprising:
generating a public/private key pair;
generating a secret shared key using the respective public keys of the other nodes, and the secret shared key is unknown to the central node;
using the secret shared key as a seed of a random generator to generate transformation matrices that correspond to respective isometric transformations of node data;
wherein the transformation matrices are multiplied together to create a complete transformation matrix common to all the nodes, but unknown to the central node;
using the complete transformation matrix to transform the node data into transformed data; and
transmitting the transformed data, but not the node data, to the central node, and the transformed data is usable by the central node to identify an anomaly in the node data when the central node applies a time series discord finding algorithm to the transformed data.

2. The method as recited in claim 1, wherein the transformed data is non-anonymized but a privacy of the transformed data is preserved so that the data from which the transformed data was generated is not accessible by the central node.

3. The method as recited in claim 1, wherein the anomaly is a local anomaly, or a global anomaly.

4. The method as recited in claim 1, wherein the data comprises a multivariate or univariate time series.

5. The method as recited in claim 1, wherein the secret shared key is generated using a key agreement comprising a tuple of algorithms.

6. The method as recited in claim 4, wherein the tuple of algorithms comprises: KA.param, KA.gen, and KA.agree.

7. The method as recited in claim 1, wherein the isometric transformations comprise a reflection value, a rotation value, and a translation value.

8. The method as recited in claim 1, wherein the transformed data is indexed with information identifying the node that sent the transformed data.

9. The method as recited in claim 1, wherein the secret shared key is not known to the central node.

10. In a distributed environment including two or more nodes configured to communicate with a central node of the distributed environment, a non-transitory storage medium having stored therein instructions that are executable by one or more hardware processors to perform operations comprising:
generating a public/private key pair;
generating a secret shared key using the respective public keys of the other nodes, and the secret shared key is unknown to the central node;
using the secret shared key as a seed of a random generator to generate transformation matrices that correspond to respective isometric transformations of node data;
wherein the transformation matrices are multiplied together to create a complete transformation matrix common to all the nodes, but unknown to the central node;
using the complete transformation matrix to transform the node data into transformed data; and
transmitting the transformed data, but not the node data, to the central node, and the transformed data is usable by the central node to identify an anomaly in the node data when the central node applies a time series discord finding algorithm to the transformed data.

11. The non-transitory storage medium as recited in claim 10, wherein the transformed data is non-anonymized but a privacy of the transformed data is preserved so that the data from which the transformed data was generated is not accessible by the central node.

12. The non-transitory storage medium as recited in claim 10, wherein the anomaly is a local anomaly, or a global anomaly.

13. The non-transitory storage medium as recited in claim 10, wherein the data comprises a multivariate or univariate time series.

14. The non-transitory storage medium as recited in claim 10, wherein the secret shared key is generated using a key agreement comprising a tuple of algorithms.

15. The non-transitory storage medium as recited in claim 13, wherein the tuple of algorithms comprises: KA.param, KA.gen, and KA.agree.

16. The non-transitory storage medium as recited in claim 10, wherein the isometric transformations comprise a reflection value, a rotation value, and a translation value.

17. The non-transitory storage medium as recited in claim 10, wherein the transformed data is indexed with information identifying the node that sent the transformed data.

18. The non-transitory storage medium as recited in claim 10, wherein the secret shared key is not known to the central node.

* * * * *